Jan. 14, 1958   G. L. LAMB   2,819,793
BEVERAGE CONTAINER
Filed Nov. 10, 1954
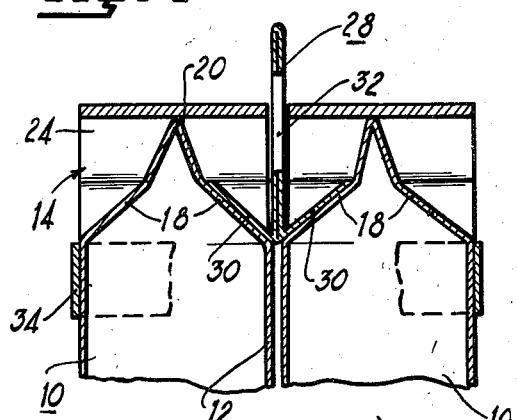
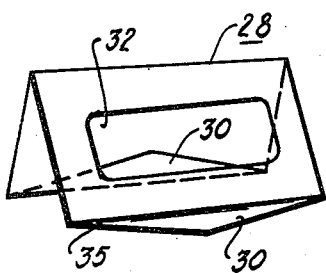
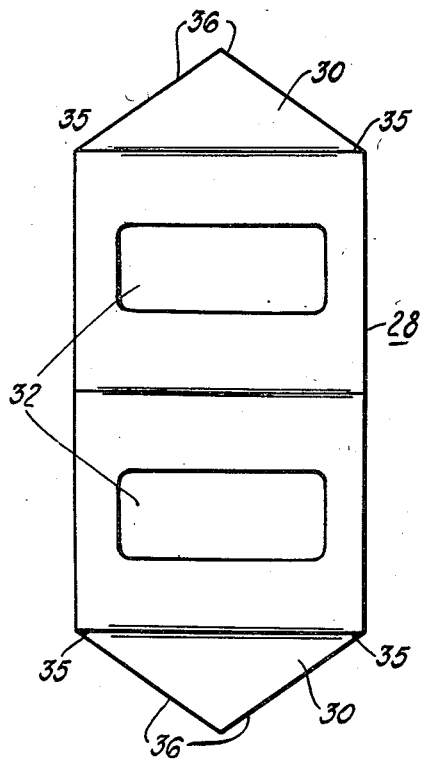
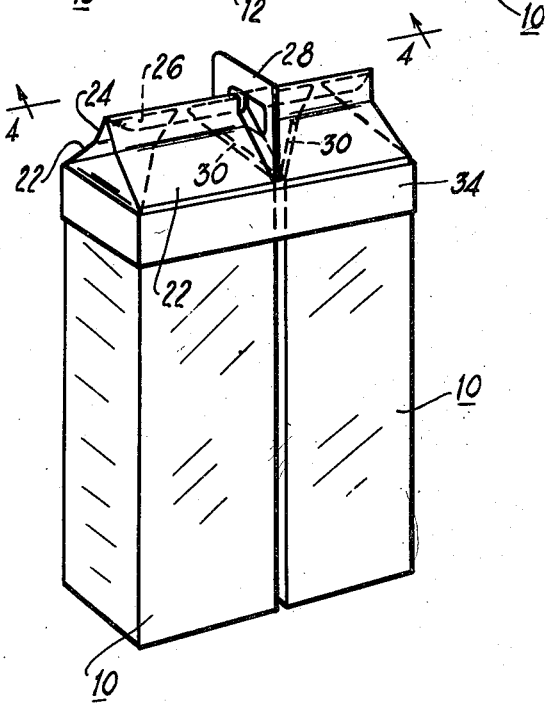
INVENTOR.
GUY L. LAMB
BY H. O. Clayton
ATTORNEY United States Patent Office 2,819,793
Patented Jan. 14, 1958

2,819,793

BEVERAGE CONTAINER

Guy L. Lamb, Elkhart, Ind., assignor to Edlo, Incorporated, San Francisco, Calif., a corporation of California Application November 10, 1954, Serial No. 467,950

1 Claim. (Cl. 206—65)

This invention relates in general to an improvement in the field of containers and in particular to a container adapted to facilitate the sale of a beverage such as milk.

It is an object of my invention to provide a simple handle for a plurality of paper milk cartons, one that may be cheaply manufactured and easily applied to the cartons, to provide, together with a plurality of cartons and a keeper element, a compact unit adapted to be used to transport, say one half gallon of milk or other material.

It is a further object of my invention to provide a container adapted to be used in the sale of milk, said container including, in combination, a plurality of cartons, preferably of paper, a carrier or handle also preferably constituted of paper, and a keeper element for the handle, the cartons, carrier and keeper together constituting a container as a unit.

Yet another object of my invention is to provide a multi-part milk container which may be easily assembled and disassembled, said container serving to facilitate both the retail and wholesale merchandising of milk as a beverage.

Other objects of the invention and desirable details of construction and combinations of parts will become apparent from the following description of a preferred embodiment of my invention, which description is taken in conjunction with the accompanying drawings, in which:

Figure 1 discloses, in perspective, the preferred embodiment of the carrier unit constituting my invention;

Figures 2 and 3 disclose different views of the handle of the carrier unit of Figure 1; and Figure 4 is a sectional view, taken on the line 4—4 of Figure 1, disclosing details of the carrier unit of Figure 1.

There is disclosed in the four figures of the drawings a preferred embodiment of my invention well suited to transport a beverage, or a solid such as cottage cheese, in say one half gallon lots. The cartons of Figure 1, preferably two in number and of suitable paper material, are indicated by the reference numeral 10, and being duplicates of each other the description of one will suffice for both. Each of the cartons 10, no claim to which is made, is preferably of one piece and includes a body portion 12, Figure 4, and a top portion 14. This top portion 14 includes triangular shaped end portions 18 inclined upwardly to a point 20 in the center of the top; and the top portion also includes rectangular shaped side portions 22, Figure 1, also inclined upwardly and toward the center of the top. Each side portion 22 is, near its peripheral edge, inclined upwardly to provide a rim portion 24, one of said portions being extended to provide a lip 26 which is bent over and fits within a pocket provided by one of the rim portions 24 and portions of the top of the carton, not shown, which join one of the side portions 22 with the end portions 18. As is disclosed in Figure 1, the rim portions 24 are slightly spaced from each other to provide a member V shaped in section.

A generally rectangular shaped handle 28, disclosed in detail in Figures 2 and 3, is provided, at its ends, with triangular shaped tab members 30 and these members project outwardly from the body of the handle as is disclosed in Figures 1, 3 and 4. Figure 2 discloses the handle prior to folding the blank of this figure to provide the two part body portion. Openings 32, one in each half of the blank of Figure 2, provide a single opening in the finished handle of Figures 1, 3 and 4 said opening receiving the fingers of the human hand.

Describing now the assembly of the parts of the container unit of Figure 1, the handle 28, is placed between the pair of cartons 10, the tabs 30, as a supporting means, being slipped into place upon the inclined end portions 18 and completely covering said portions. A keeper or band member 34 is then slipped over the bottom of the two cartons and drawn upwardly to the position disclosed in Figure 1, to complete the container unit. In the latter operation the cooperating parts of the handle and cartons are bound securely together thereby providing, by the whole, a compact unit well adapted to transport either a beverage or a solid material such as cottage cheese. It is important to note that when the unit is being carried by grasping the handle 28 the base portions 35 of side edges 36, Figure 2, of the tabs contact the base of the side portions 22 of the top of the carton. It is also to be noted, as disclosed in Figures 1 and 4, that in the interests of stability and compactness a major portion of the handle lies between the top portions of the cartons.

Although only one embodiment of the invention has been illustrated and described, various changes in the form and relative arrangement of the parts may be made to suit requirements.

I claim:

A multi-part container unit comprising, a plurality of separate containers each container being fashioned at its top portion to provide a recess outlined in part by an inclined triangular shaped portion, a generally rectangular shaped one piece handle member positioned between and in disconnected engagement with the containers, said member being folded at its central portion to provide two substantially identical parts positioned back to back, the fold extending in a line lying in a plane extending between the containers, said handle member including two triangular shaped hanger members integrally connected to its lower edge and extending outwardly and upwardly therefrom on opposite sides thereof with the apices of the triangles snugly fitting within the recesses of the containers; together with a one piece keeper member relatively tightly encircling the containers and serving to bind the containers together with the handle tightly fitted therebetween.

References Cited in the file of this patent

UNITED STATES PATENTS

| | | |
|---|---|---|
| 2,514,858 | Gray | July 11, 1950 |
| 2,680,039 | Burge | June 1, 1954 |
| 2,694,596 | Greenlau et al. | Nov. 16, 1954 |
| 2,696,401 | Church et al. | Dec. 7, 1954 |